(12) United States Patent
Vaszary et al.

(10) Patent No.: US 7,353,378 B2
(45) Date of Patent: Apr. 1, 2008

(54) OPTIMIZING COMPUTER SYSTEM

(75) Inventors: Mark Kendall Vaszary, Roseville, CA (US); Douglas Nelson, Cameron Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 11/061,392

(22) Filed: Feb. 18, 2005

(65) Prior Publication Data

US 2006/0190714 A1    Aug. 24, 2006

(51) Int. Cl.
*G06F 1/24* (2006.01)
(52) U.S. Cl. .................... 713/100; 713/1; 709/221
(58) Field of Classification Search ............ 713/100, 713/1; 709/221
See application file for complete search history.

(56) References Cited

U.S. PATENT DOCUMENTS

| | | | |
|---|---|---|---|
| 6,059,842 A * | 5/2000 | Dumarot et al. | 717/153 |
| 6,829,491 B1 * | 12/2004 | Yea et al. | 455/560 |
| 2003/0014507 A1 | 1/2003 | Bertram et al. | |
| 2004/0128651 A1 * | 7/2004 | Lau | 717/124 |
| 2005/0132323 A1 * | 6/2005 | Huerta et al. | 717/100 |

FOREIGN PATENT DOCUMENTS

WO    WO 02/39695    5/2002

OTHER PUBLICATIONS

Chung I-Hsin et al, "Automated cluster-based web service performance turning", IEEE Int Symp High Perform Distrib Comput Proc; IEEE International Symposium On High Performance.

* cited by examiner

*Primary Examiner*—Thuan Du
(74) *Attorney, Agent, or Firm*—Thomas, Kayden, Horstemeyer & Risley, LLP

(57) ABSTRACT

A computer-implemented method for improving the performance of a dynamically configurable computer system. The dynamically configurable computer system is created from components disposed in a dynamically reconfigurable computing environment. The method includes ascertaining a set of configuration parameters pertaining to a model computer system within the dynamically configurable computing environment. The model computer system is different from the dynamically configurable computer system. The method further includes optimizing the dynamically configurable computer system using at least a portion of the set of configuration parameters. The optimizing causes the dynamically configurable computer system to perform differently after the optimizing.

28 Claims, 3 Drawing Sheets

OPTIMIZING COMPUTER SYSTEM

BACKGROUND OF THE INVENTION

Computer networks for implementing dynamically reconfigurable computer systems have existed for some time. In an example dynamically reconfigurable computing environment (hereinafter "DRCE"), hardware components (such as servers, CPUs, memories, I/Os, switches, etc.) may be coupled together in a network. These hardware components, together with software components (e.g., operating systems, drivers, applications, etc.), form a common pool of components from which computer systems may be configured. For example, a set of components may be selected from the common pool and dynamically configured to create one or more computer systems having desired performance characteristics. Computer operators may also dynamically reconfigure existing computer systems by adding and/or removing components to suit changing requirements. Grid and/or utility computing approaches from the Hewlett-Packard Company of Palo Alto, Calif. represent examples of DRCE.

Within a DRCE, there may exist different computer systems, all configured using parameters supplied by their human operators. DRCE hardware and software components are, however, not identical. For example, certain CPUs may have greater processing capabilities than others. Even if two components have identical specifications, a component may be more suitable, due to its geographic location or its relative positions vis-à-vis other components, for implementing a given computing solution (i.e., a computer system for executing a given application). Accordingly, for a particular class of solution, some dynamically configured computer systems may perform more optimally than others.

As an example, two dynamically configured computer systems running identical accounting software may have different performance characteristics due to the fact that one computer system may be configured with different hardware components (e.g., with different memories, I/Os, switches, etc.) from the other system. As a further example, even if the above-mentioned two computer systems are configured with identical hardware components, it is possible that one computer system may have better performance than another if, for example, the CPU of the former computer system is disposed closer to its memory subsystem (and therefore can access its memory subsystem more efficiently). As can be appreciated, some computer systems may perform less optimally than others.

Furthermore, even if a dynamically configurable computer system operates satisfactorily at a given point in time, external factors (such as the processing load affecting that computer system or affecting network components that may be shared by that computer system) may change over time, causing the performance to suffer. Performance degradation leads to user dissatisfaction and inefficiency, and a solution is therefore desired.

SUMMARY OF INVENTION

The invention relates, in an embodiment, to a computer-implemented method for improving the performance of a dynamically configurable computer system. The dynamically configurable computer system is created from components disposed in a dynamically reconfigurable computing environment. The method includes ascertaining a set of configuration parameters pertaining to a model computer system within the dynamically configurable computing environment. The model computer system is different from the dynamically configurable computer system. The method further includes optimizing the dynamically configurable computer system using at least a portion of the set of configuration parameters. Optimization causes the dynamically configurable computer system to perform differently after the optimizing.

In yet another embodiment of the invention, the invention relates to a computer-implemented method for improving the performance of a dynamically configurable computer system. The dynamically configurable computer system is created from components disposed in a dynamically reconfigurable computing environment. The method includes ascertaining a performance trend from performance parameters associated with the dynamically configurable computing environment. The method further includes creating set of configuration parameters responsive to the performance trend. The method also includes optimizing the dynamically configurable computer system using at least a portion of the set of configuration parameters. The optimizing causes the dynamically configurable computer system to perform differently after the optimizing.

In yet another embodiment of the invention, the invention relates to an arrangement for improving the performance of a dynamically configurable computer system. The dynamically configurable computer system is created from components disposed in a dynamically reconfigurable computing environment. The arrangement includes a means for ascertaining a set of configuration parameters pertaining to a model computer system within the dynamically configurable computing environment. The arrangement also includes the model computer system being different from the dynamically configurable computer system. The arrangement further includes a means for optimizing the dynamically configurable computer system using at least a portion of the set of configuration parameters. The optimizing causes the dynamically configurable computer system to perform differently after the optimizing.

In yet another embodiment of the invention, the invention relates to an article of manufacture containing a program storage medium having computer readable code embodied therein. The computer readable code is configured to improve the performance of a dynamically configurable computer system. The dynamically configurable computer system is created from components disposed in a dynamically reconfigurable computing environment. The article of manufacture includes computer readable code for ascertaining a set of configuration parameters pertaining to a model computer system within the dynamically configurable computing environment. The model computer system is different from the dynamically configurable computer system. The article of manufacture further includes computer readable code for optimizing the dynamically configurable computer system using at least a portion of the set of configuration parameters. The optimizing causes the dynamically configurable computer system to perform differently after the optimizing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

Figure 1:
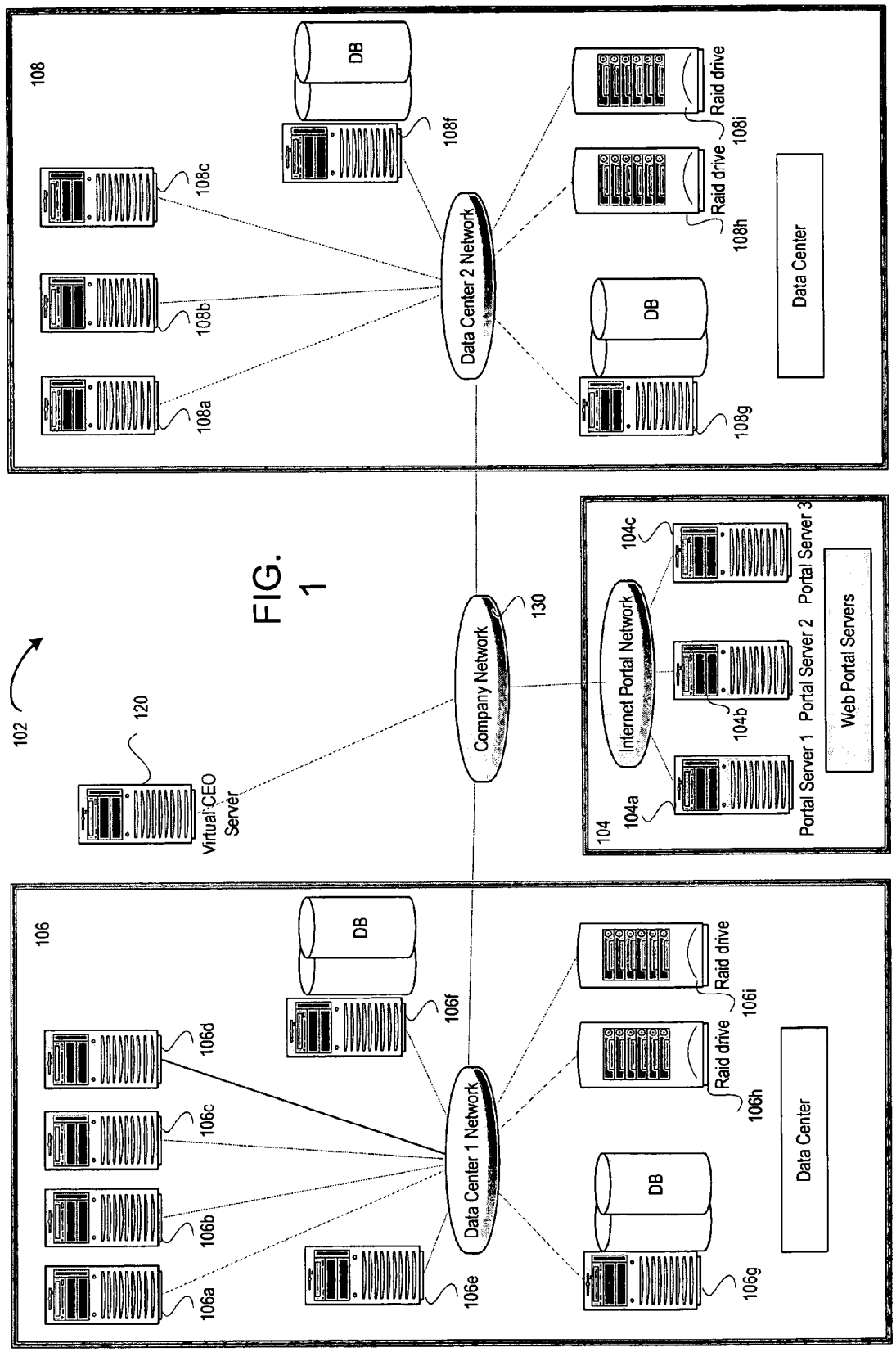
FIG. 1 shows, in an embodiment of the present invention, an example dynamically reconfigurable computing environment, including a portal network and two data center networks.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention. Examples of such apparatus may include appropriate dedicated and/or programmable circuitry in one or more integrated circuits configured to carry out the computer-implemented techniques disclosed herein.

In an embodiment, the invention relates to a computer-implemented method for improving the performance of dynamically configurable computer systems in a dynamically configurable computing environment (DRCE). As the term is employed herein, a dynamically configurable computer system includes any computer system that can be dynamically configured from a common pool of hardware and/or software components.

In an embodiment, the common pool of hardware components may be disposed in a network. A user may furnish a desired specification for creating a computer system from the common pool of components. Any desired computer system may be dynamically configured by appropriately choosing the required hardware components and by loading the required software (e.g., operating system and/or application) onto the configured computer system.

A dynamically configurable computer system may also be modified by adding and/or removing hardware and/or software components. Upon hardware reconfiguration, for example, the software may be reloaded and/or migrated onto the newly reconfigured hardware, enabling the applications thereon to continue to execute. It should be understood that the common pool of hardware and/or software components, together with the hardware and/or software facilities that enable the dynamic configuration (including reconfiguration) of computer systems, form the dynamically configurable computing environment (DRCE).

Computer systems are created to perform a particular task or tasks. Computer systems, together with their operating systems and/or applications, may be classified into solution classes. Computers are said to belong to a solution class if they have similar or analogous input/output requirements, similar or analogous processing requirements, and/or are directed to solve similar and/or analogous problems. Computers may be classified into solution classes explicitly (i.e., designated by the human operator) or implicitly (i.e., automatically classified based on some common characteristics).

In a web-based e-commerce situation, for example, web servers that are configured to take orders and create invoices may belong to one solution class, while application servers that are configured to perform order fulfillment and shipping may belong to another solution class. Database servers that are configured to perform the backend accounting functions may belong to yet another solution class. Other solutions classes may include, without limitation, finance, supply chain, manufacturing, balanced scorecard reporting, transactional database, data warehousing, web portals, intranets, customer external websites, etc.

In an embodiment, the performance of dynamically configurable computer systems in a given solution class are monitored to identify the best performing computer system in that solution class. Since different computer systems may be created by different human operators, may be created at different times, or may be created using different parameters, the performance may vary even though they are in the same solution class. After the best performing computer system in a solution class is identified, configuration parameters (including hardware and/or software parameters) of the identified best performing computer system may then be employed to improve the performance of other computer systems in the solution class.

In an embodiment, the performance characteristics of the DRCE may be monitored over time in order to identify performance trends. These performance trends may then be employed for proactively improving the performance of dynamically configurable computer systems in the DRCE. For example, the analysis of the performance data of a given DRCE may suggest that toward the end of a fiscal quarter, the number of new orders drops off while the need to finalize accounting reports frequently overloads computers running accounting applications. With this information, it is possible to allocate resources in the form of hardware and/or software components from order-taking computer systems to computer systems that run accounting software even before the latter computer systems become overloaded.

As another example, the analysis of the performance data of a given DRCE may suggest that when the weather forecast calls for snow, a greater number of employees of a particular company opts to telecommute. With this information, additional resources in the form of hardware and/or software components may be allocated to servers that handle the telecommuting needs in response to an adverse weather forecast. By reconfiguring computer systems in advance to meet the anticipated change in computing requirements, a high level of performance may be maintained even before the computing load changes.

The features and advantages of embodiments of the invention may be better understood with reference to the figures and discussions that follow. FIG. 1 shows, in accordance with an embodiment of the present invention, an example dynamically reconfigurable computing environment 102, including a portal network 104 and two data center networks 106 and 108. Portal network 104 includes three portal servers 104a, 104b, and 104c, representing dynamically reconfigurable computer systems configured as web servers. In this example, the portal servers may be said to belong in the portal server solution class.

Data center network 106 includes five application servers 106a, 106b, 106c, 106d, and 106e. These application servers represent dynamically reconfigurable computer systems configured to run different applications. There are also shown two database servers 106f and 106g, representing dynamically reconfigurable computer systems that are configured to function as database servers. Also shown are two RAID (Redundant Arrays of Inexpensive Disks) systems 106h and 106i, representing dynamically reconfigurable computer systems configured to store data.

Data center network 108 includes three application servers 108a, 108b, and 108c. Similar to their counterparts in data center network 106, these application servers represent dynamically reconfigurable computer systems configured to run different applications. There are also shown two database servers 108f and 108g, representing dynamically reconfigurable computer systems that are configured to function as database servers. Also shown are two RAID (Redundant Arrays of Inexpensive Disks) systems 108h and 108i, representing dynamically reconfigurable computer systems configured to store data.

Suppose application servers 106a, 106c and 108b are configured as accounting systems, i.e., they belong to the same solution class. A virtual computing environment optimizer (VCEO) server 120 monitors the performance of application servers 106a, 106c, and 108b via a network 130 (which interconnects VCEO server 120, portal network 104, data center 106, and data center 108) to determine the model computer system among the three, i.e., the computer system in the solution class that offers the best performance.

Such monitoring may be undertaken using commercially available hardware and/or software discovery tools and/or appropriate benchmarking. Hardware discovery may include, for example, the analysis of kernel parameters, memory usage, hard drive usage, memory swapping, data access rate, network traffic throughput, port utilization, etc. Software discovery may include identifying, for example, the applications being executed, the amount of system resources utilized by each application, applications that are not used, etc. Monitoring may also include network traffic monitoring, database performance characteristics, etc. Monitoring may be performed using a variety of benchmarks (such as I/O throughput, transactions per minute, number of bytes read, number of bytes write, cache faults, etc.) It should be understood that different benchmarks may be employed to measure the performance of computer systems, and the specific benchmarks employed may depend on the type of application being executed and/or the software and/or hardware involved.

Once the best performing computer system in the solution class is ascertained, the configuration parameters for this computer system may be employed to "clone" as much as possible other computer systems to improve their performance. In this example, suppose that application server 106a turns out to have the best performance characteristics. The configuration parameters (e.g., the number and types of hardware and/or software components and/or the manner with which they are provisioned) are employed to "clone" or "optimize" application servers 106c and 108b. Such optimization may include creating different computer systems having similar configuration parameters as model application server 106a and migrating the applications from application servers 106c and 108b to these new computer systems. In another embodiment, such optimization may include supplementing existing application servers 106c and 108b with additional and/or different hardware and/or software components to enable the applications thereon to execute more efficiently.

Technologies for dynamically reconfiguring a computer system by adding and/or removing hardware and/or software components exist today and any such suitable technologies may be employed without limitation. For brevity's sake, the details pertaining to techniques for dynamically reconfiguring computer systems will not be discussed herein since the reader may readily find information regarding such techniques from existing literature and internet searches (e.g., www.google.com).

Note that it is not a necessity that the optimized computer system be exactly identical to the model computer system, i.e., the computer system identified as having the best performance in the solution class. Generally speaking, the VCEO server strives to improve the performance of the other computer systems in the class as much as practicable through reconfiguration. Reconfiguration may include not only altering the hardware and/or software configuration but may also include monitoring the performance of the optimized computer system to ensure that the performance indeed improved instead of being degraded after reconfiguration. If the performance degrades after reconfiguration, the reconfigured computer system may be restored to its former (and better performing) state.

In an embodiment, the optimization via reconfiguration of the other computer systems in the solution class is performed automatically. In another embodiment, the optimization may be provided as suggestions to a human operator, who may then decide whether to optimize. The human operator may decide to accept all recommendations or may accept only selected recommendations, in essence customizing the reconfiguration in accordance to his judgment. The human operator may also choose to optimize only some computer systems but not others in the solution class in accordance to his judgment. An operator can put in parameters to optimize different from or beyond what the system provides (i.e. manual override or change).

Although VCEO 120 is shown implemented as a stand-alone server in FIG. 1, such is not a requirement. For example, VCEO 120 may also be implemented as software installed on an existing computer system or device. Multiple VCEOs may exist to gather information in a network and may work cooperatively to more efficiently optimize computer systems in the network. VCEO may be offered as a utility-based service or an installed product on the network, as desired, etc.

Figure 2:
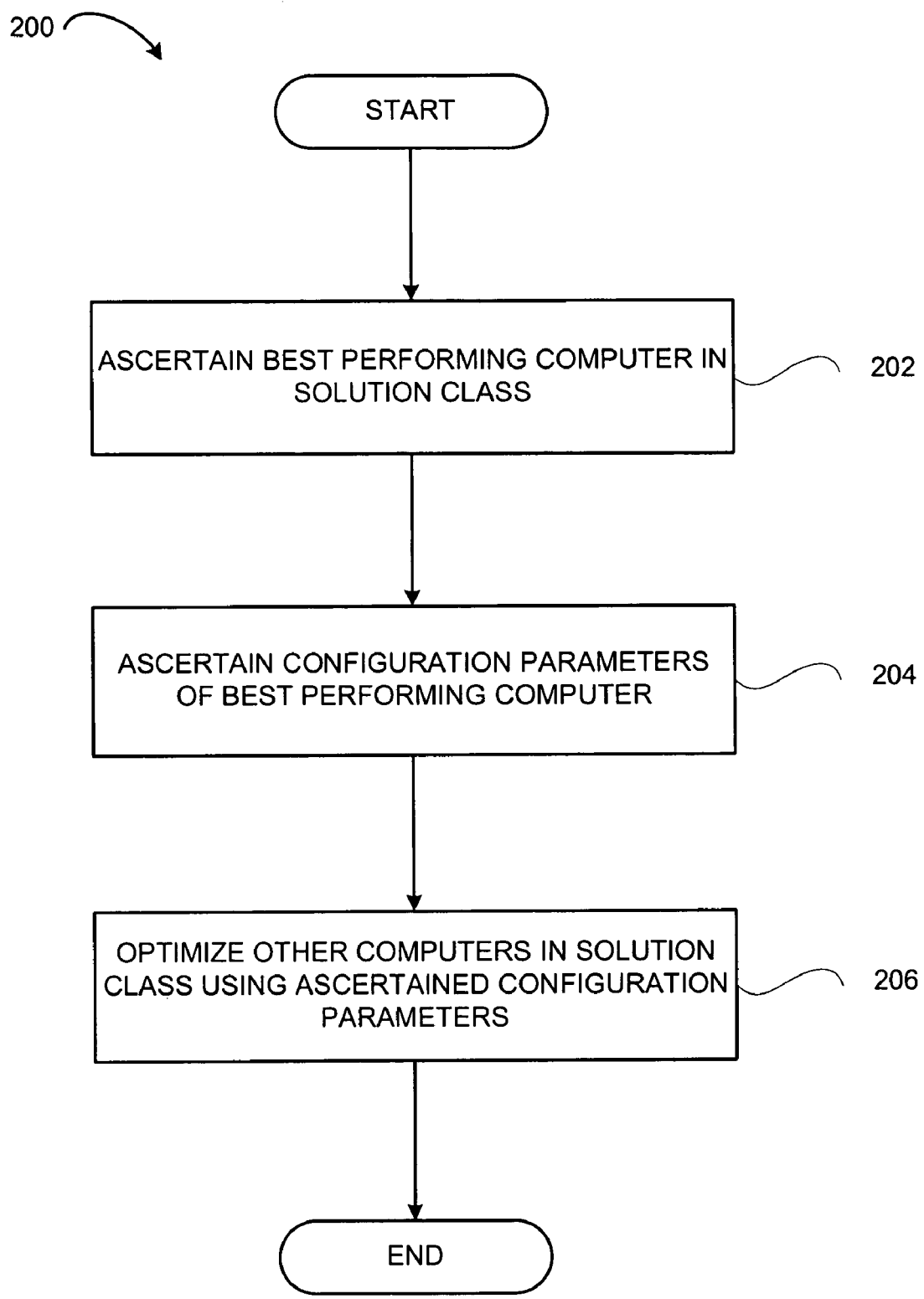
FIG. 2 shows, in an embodiment of the present invention, steps of a method taken by a virtual computing environment optimizer to improve the performance of a dynamically reconfigurable computer system.

FIG. 2 shows in accordance with an embodiment of the present invention, the steps of a method 200 taken by the virtual computing environment optimizer to improve the performance of a dynamically reconfigurable computer system. In step 202, the best performing computer system in the solution class is ascertained. In step 204, the set of configuration parameters pertaining to the model computer system (i.e., the computer system identified has having the best performance characteristics in the solution class) is ascertained. In step 206, dynamically reconfigurable computer systems in the solution class is optimized using the set of configuration parameters ascertained in step 204 (if the dynamically reconfigurable computer system to be optimized is not identified as the best performing computer system). As mentioned, optimizing may include changing the hardware and/or software constituency of the dynamically reconfigurable computer system.

As mentioned, the performance characteristics of the DRCE may be monitored to identify performance trends. These performance trends may be employed to proactively reconfigure computer systems in the DRCE to meet anticipated needs. By proactively reconfigure computer systems to meet anticipated needs instead of reacting to performance shortcomings, it is possible to maintain a higher level of performance.

Figure 3:
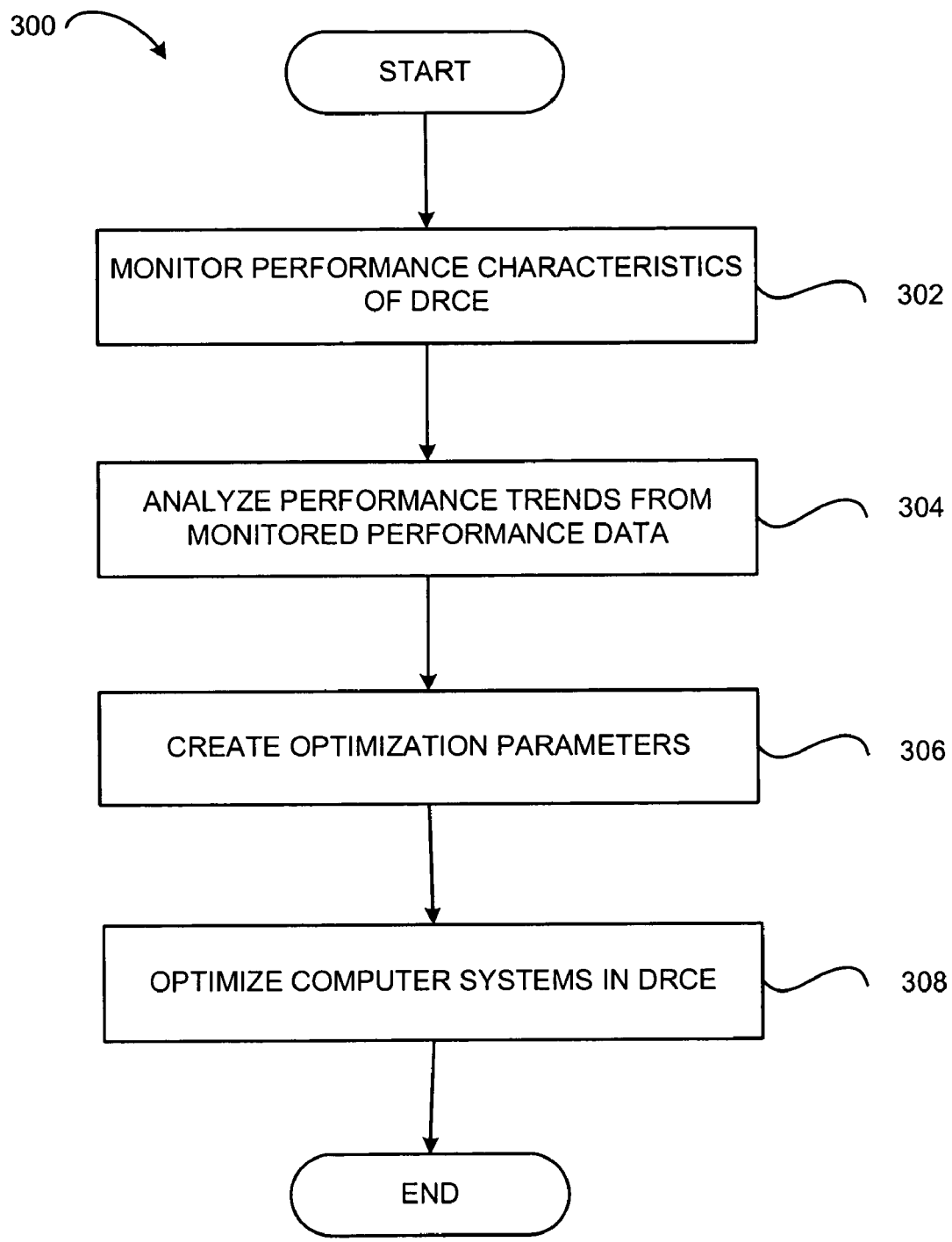
FIG. 3 shows, in an embodiment of the present invention, steps of a method for optimizing dynamically reconfigurable computer systems using monitored performance trends.

FIG. 3 shows, in accordance with an embodiment, the steps of a method 300 for optimizing dynamically reconfigurable computer systems using monitored performance trends. In step 302, the performance characteristics of various computer systems in the dynamically configurable computing environment, and optionally of network performance parameters, are monitored. In step 304, the performance characteristics are analyzed for performance trends. The performance trend data may identify performance deficiencies and/or opportunities for performance improvement in one or more computer systems. These performance trends may be ascertained using any number of available statistical techniques or heuristics.

In step 306, optimization parameters are formed. The optimization parameters may represent hardware and/or software configuration parameters automatically formulated to optimize the performance of computer systems in the DRCE to more suitably meet anticipated changes. For example, if the performance trend data identifies that the processor utilization of a given accounting computer system tends to exceed a given threshold toward the end of the fiscal quarter, the optimization parameters may include increasing the number of processors allocated to that accounting computer system toward the end of the fiscal quarter. The optimization parameters may also include suggestions furnished to a human operator for approval and/or adoption, either wholly or in part.

In step 308, at least some of the optimization parameters formed in step 306 are employed to proactively optimize selected computer systems in order to enable these computer systems to meet the anticipated changes, thereby allowing these computer systems to maintain a high level of performance. In an embodiment, the optimization is performed before the performance of the computer system or computer systems to be configured begins to suffer. That is, the optimization is performed at a time predicted by the performance trend as appropriate to maintain a desired level of performance both before the optimization and after the optimization. In this manner, the optimization not only aims to remedy a performance degradation but also aims, in an embodiment, to prevent the performance degradation to occur in the first place. The optimization may cause some computer systems to have improved performance (e.g., those that need the extra processing power to handle an anticipated increase in processing need) and may cause other computer system to have reduced processing capabilities (e.g., those computers identified by the performance trend as not needing as much processing capabilities).

As can be appreciated from the foregoing, embodiments of the invention identify the most optimal computer system within a solution class and optimize other computer systems in that solution class using configuration parameters associated with the computer system identified as most optimal. If configuration changes are needed, embodiments of the invention may recommend the changes to a human operator or may undertake the optimization task automatically. Since embodiments of the invention compare the relative performance of computer systems within a solution class to identify the most optimal computer, the invention can flexibly accommodate any type of computer system without having to know in advance the absolute acceptable performance criteria for any particular computer system. In other words, there is no need to ascertain or identify an absolute performance threshold in advance for the purpose of identifying the most optimal computer system within a solution class and thus there is no inherent limit with respect to the type of computer system that can be optimized. Furthermore, embodiments of the invention proactively optimize computer systems in a DRCE in advance of changing conditions, thereby advantageously maintaining a high level of performance even when external circumstances change the loads on computer systems in the DRCE.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for improving the performance of a dynamically configurable computer system, said dynamically configurable computer system being created from components disposed in a dynamically reconfigurable computing environment, comprising:

monitoring performances of a plurality of dynamically configurable computer systems in a solution class;

ascertaining a set of configuration parameters pertaining to a model computer system identified from said plurality of dynamically configurable computer systems within said dynamically configurable computing environment, said model computer system being different from said dynamically configurable computer system; and optimizing said dynamically configurable computer system using at least a portion of said set of configuration parameters, said optimizing causing said dynamically configurable computer system to perform differently after said optimizing.

2. The computer-implemented method of claim 1 further comprising:

ascertaining said model computer system by comparing the performance of said model computer system against at least one other computer system in said dynamically reconfigurable computing environment.

3. The computer-implemented method of claim 2 wherein said model computer system and said dynamically configurable computer system belong to the same solution class.

4. The computer-implemented method of claim 3 wherein said model computer system represents the best performing computer system in said solution class.

5. The computer-implemented method of claim 4 wherein said solution class is explicitly identified by an operator of said dynamically configurable computing environment.

6. The computer-implemented method of claim 4 wherein said solution class is implicitly identified based on a set of common characteristics.

7. The computer-implemented method of claim 1 wherein said optimizing includes changing at least one of a hardware component constituency and a software component constituency for said dynamically configurable computer system.

8. The computer-implemented method of claim 1 wherein said optimizing causes said dynamically configurable computer system to perform with a higher level of performance after said optimizing.

9. A computer-implemented method for improving the performance of a dynamically configurable computer system, said dynamically configurable computer system being created from components disposed in a dynamically reconfigurable computing environment, comprising:
  ascertaining a performance trend from performance parameters associated with said dynamically configurable computing environment;
  creating a set of configuration parameters responsive to said performance trend; and
  optimizing said dynamically configurable computer system using at least a portion of said set of configuration parameters, said optimizing causing said dynamically configurable computer system to perform differently after said optimizing.

10. The computer-implemented method of claim 9 wherein said optimizing being performed at a time predicted by said performance trend as appropriate to at least maintain a given level of performance before said optimizing and after said optimizing.

11. The computer-implemented method of claim 10 wherein said optimizing includes changing at least one of a hardware component constituency and a software component constituency for said dynamically configurable computer system.

12. The computer-implemented method of claim 10 wherein said ascertaining said performance trend includes measuring performance parameters associated with said dynamically configurable computer system over time.

13. The computer-implemented method of claim 10 wherein said optimizing causes said dynamically configurable computer system to perform with a higher level of performance after said optimizing.

14. The computer-implemented method of claim 10 wherein said optimizing causes said dynamically configurable computer system to have reduced processing capabilities after said optimizing.

15. An arrangement for improving the performance of a dynamically configurable computer system, said dynamically configurable computer system being created from components disposed in a dynamically reconfigurable computing environment, comprising:
  means for monitoring performances of a plurality of dynamically configurable computer systems in a solution class;
  means for ascertaining a set of configuration parameters pertaining to a model computer system identified from said plurality of dynamically configurable computer systems within said dynamically configurable computing environment, said model computer system being different from said dynamically configurable computer system; and
  means for optimizing said dynamically configurable computer system using at least a portion of said set of configuration parameters, said optimizing causing said dynamically configurable computer system to perform differently after said optimizing.

16. The arrangement of claim 15 wherein said means for ascertaining said set of configuration parameters includes means for ascertaining said model computer system by comparing the performance of said model computer system against at least one other computer system in said dynamically reconfigurable computing environment.

17. The arrangement of claim 16 wherein said model computer system and said dynamically configurable computer system belong to the same solution class.

18. The arrangement of claim 17 wherein said model computer system represents the best performing computer system in said solution class.

19. The arrangement of claim 18 wherein said solution class is explicitly identified by an operator of said dynamically configurable computing environment.

20. The arrangement of claim 18 wherein said solution class is implicitly identified based on a set of common characteristics.

21. The arrangement of claim 15 wherein said optimizing causes said dynamically configurable computer system to perform with a higher level of performance after said optimizing.

22. An article of manufacture comprising a program storage medium having computer readable code embodied therein, said computer readable code being configured to cause a computer, when executed by the computer, to improve the performance of a dynamically configurable computer system, said dynamically configurable computer system being created from components disposed in a dynamically reconfigurable computing environment, comprising:
  computer readable code for monitoring performances of a plurality of dynamically configurable computer systems in a solution class;
  computer readable code for ascertaining a set of configuration parameters pertaining to a model computer system identified from said plurality of dynamically configurable computer systems within said dynamically configurable computing environment, said model computer system being different from said dynamically configurable computer system; and
  computer readable code for optimizing said dynamically configurable computer system using at least a portion of said set of configuration parameters, said optimizing causing said dynamically configurable computer system to perform differently after said optimizing.

23. The article of manufacture of claim 22 wherein said computer readable code for ascertaining said set of configuration parameters includes computer readable code for ascertaining said model computer system by comparing the performance of said model computer system against at least one other computer system in said dynamically reconfigurable computing environment.

24. The article of manufacture of claim 23 wherein said model computer system and said dynamically configurable computer system belong to the same solution class.

25. The article of manufacture of claim 24 wherein said model computer system represents the best performing computer system in said solution class.

26. The article of manufacture of claim 25 wherein said solution class is explicitly identified by an operator of said dynamically configurable computing environment.

27. The article of manufacture of claim 25 wherein said solution class is implicitly identified based on a set of common characteristics.

28. The article of manufacture of claim 22 wherein said optimizing causes said dynamically configurable computer system to perform with a higher level of performance after said optimizing.

* * * * *